Figure 11:
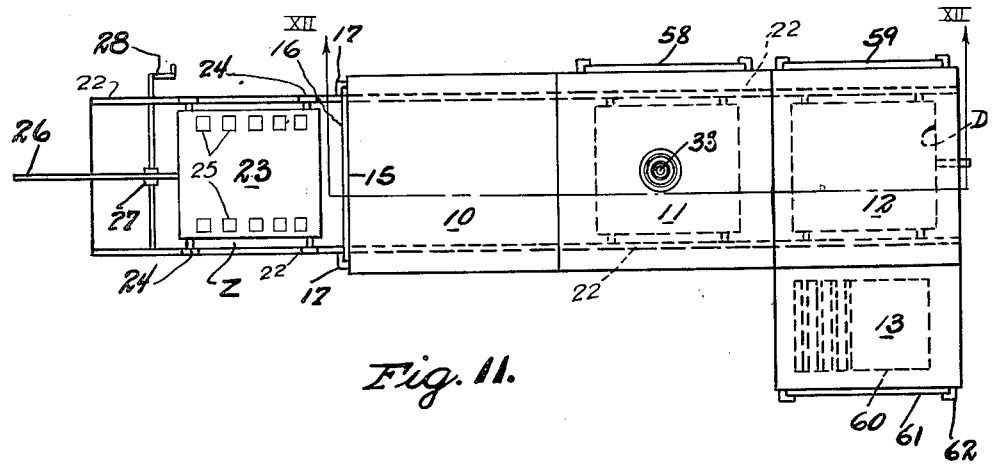

Jan. 13, 1953     W. R. CLEVER ET AL     2,624,979
METHOD OF PRODUCING WELDED DOUBLE GLAZED UNITS
Original Filed Dec. 28, 1948     5 Sheets-Sheet 1
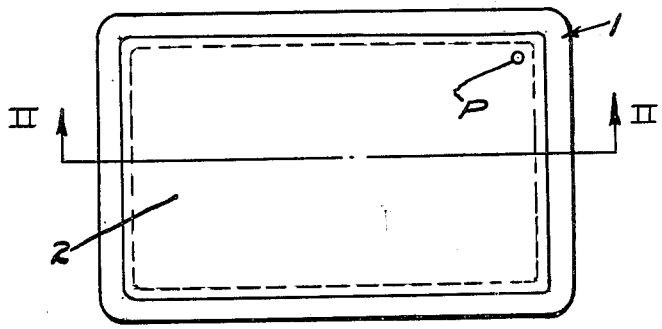
Fig. 1.
Fig. 2.
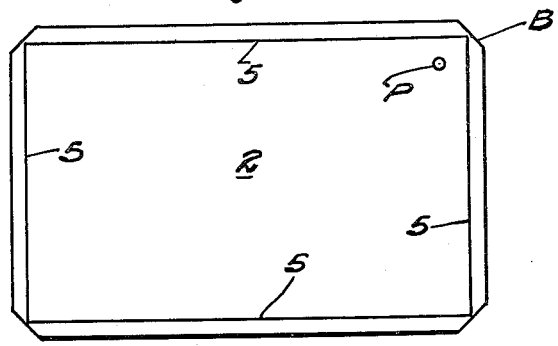
Fig. 3.
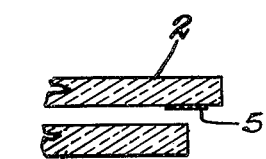 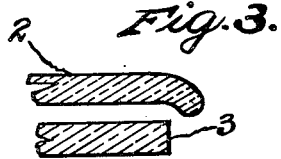 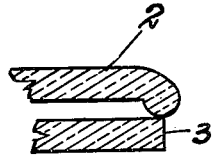
Fig. 4.     Fig. 5.     Fig. 6.
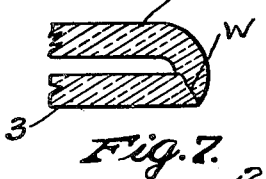 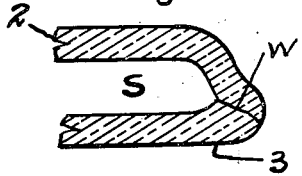 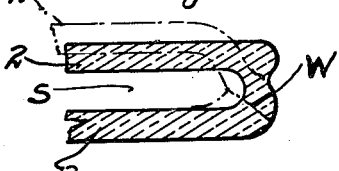
Fig. 7.     Fig. 8.     Fig. 9.
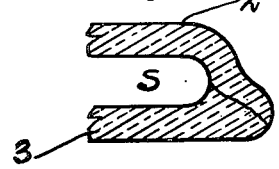
Fig. 10.
INVENTORS.
WILLIAM R. CLEVER AND
BY HARRY O. PHALIN
Glen E. Bee
ATTORNEY.

Jan. 13, 1953 W. R. CLEVER ET AL 2,624,979
METHOD OF PRODUCING WELDED DOUBLE GLAZED UNITS
Original Filed Dec. 28, 1948 5 Sheets-Sheet 2

INVENTORS
WILLIAM R. CLEVER AND
HARRY O. PHALIN
BY Glen E. Bee
ATTORNEY.

Jan. 13, 1953    W. R. CLEVER ET AL    2,624,979
METHOD OF PRODUCING WELDED DOUBLE GLAZED UNITS
Original Filed Dec. 28, 1948    5 Sheets-Sheet 3

INVENTORS
WILLIAM R. CLEVER AND
HARRY O. PHALIN
BY
Glen E. Bee
ATTORNEY.

Jan. 13, 1953 W. R. CLEVER ET AL 2,624,979
METHOD OF PRODUCING WELDED DOUBLE GLAZED UNITS
Original Filed Dec. 28, 1948 5 Sheets-Sheet 5
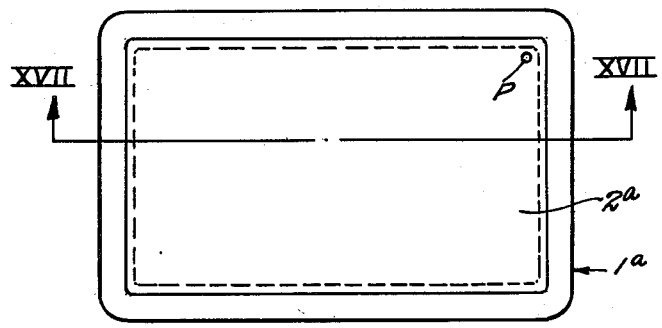
Fig. 16.
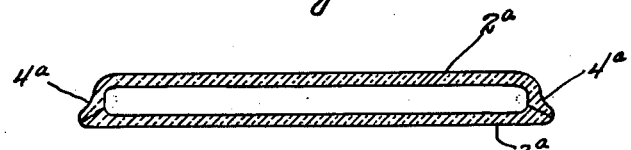
Fig. 17.
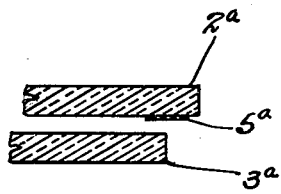 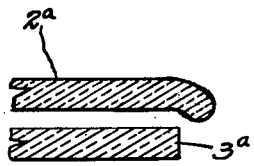 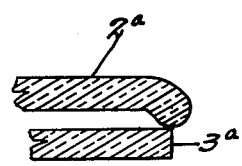
Fig. 18.   Fig. 19.   Fig. 20.
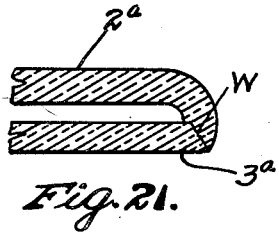 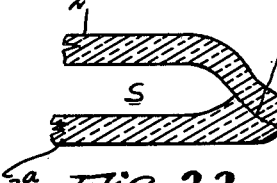 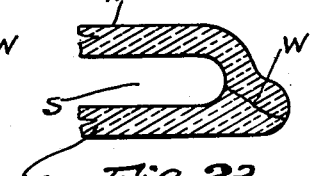
Fig. 21.   Fig. 22.   Fig. 23.
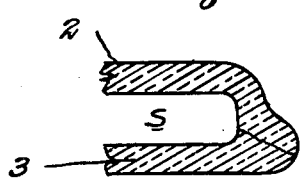
Fig. 24.
INVENTORS.
WILLIAM R. CLEVER AND
HARRY O. PHALIN
BY Glen E. Bee
ATTORNEY.

Patented Jan. 13, 1953

2,624,979

UNITED STATES PATENT OFFICE 2,624,979

METHOD OF PRODUCING WELDED DOUBLE GLAZED UNITS

William R. Clever and Harry O. Phalin, Port Allegany, Pa., assignors to Pittsburgh Corning Corporation Continuation of application Serial No. 67,696, December 28, 1948. This application March 14, 1950, Serial No. 149,562

22 Claims. (Cl. 49—82)

This invention pertains to a method of producing glass windows comprised of two or more sheets of glass disposed in horizontal spaced relation and more specifically to a process for electrically welding together the adjacent marginal edges of the sheets.

Windows of the class described are used for insulating purposes in buildings, homes and vehicles. They are also used in the walls of refrigerated chests, show cases and rooms. In each of these uses there is the constantly recurring problem of sealing the marginal edges of the spaced glass sheets to prevent the entrance of moisture into the air trapped between the sheets, which moisture is the cause of fogging of the adjacent inner faces of the sheets.

Electrically welded glass units have been made before, but the problem of providing a satisfactory connection between the spaced sheets of a double glazing unit and the weld has always presented difficulties. Until the development of the present process, the prior patented art has been silent as to a means for effectively sealing such units in a manner such that the connections between the sheets to the weld would withstand the constant expansion and contraction of the unit under the varying temperature and barometric changes to which at least one of the sheets of the unit was being subjected.

An object of the invention is to provide a method of producing a glazing unit of the character described in which the adjacent marginal edge portions of the adjacent glass sheets are formed into a continuous homogeneous connection or weld.

Another object of the invention is to provide a method of making such a weld without sharp corners which would result in stress concentrations as the unit expands and contracts.

Figure 15:
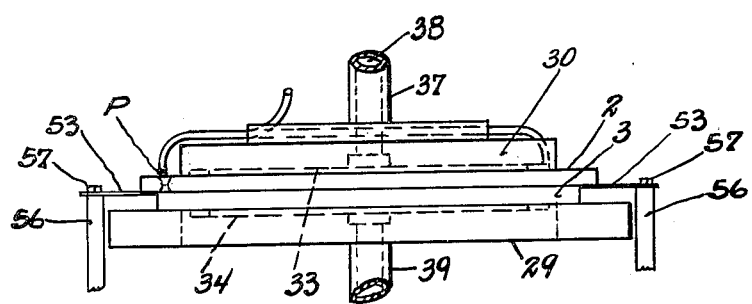
Figure 14:
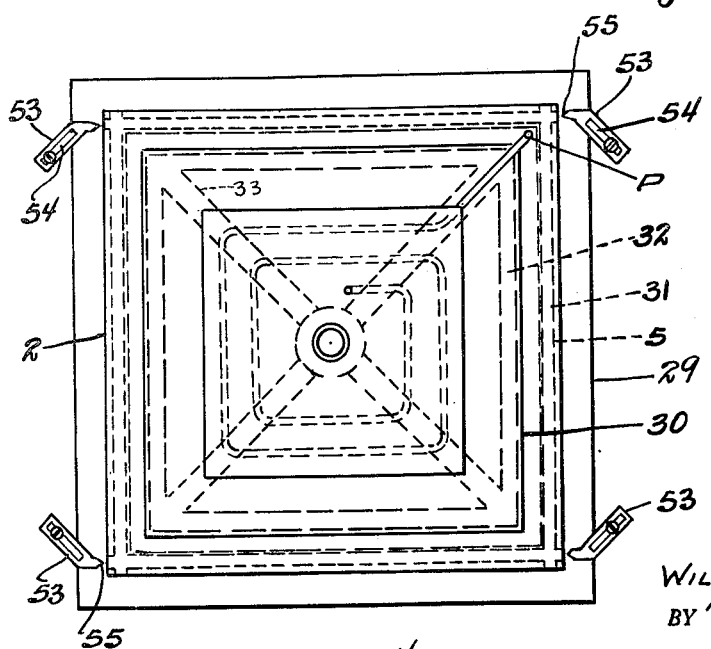
Figure 12:
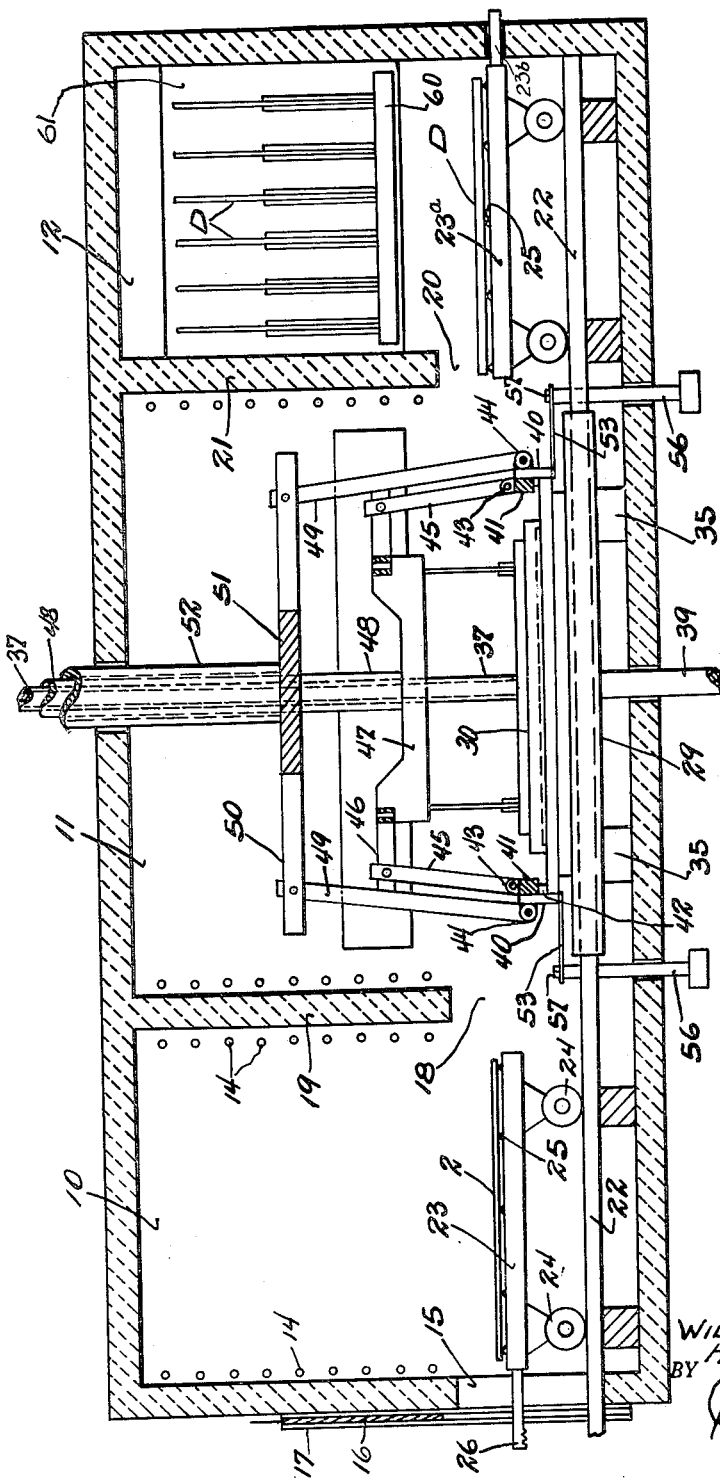
Figure 13:
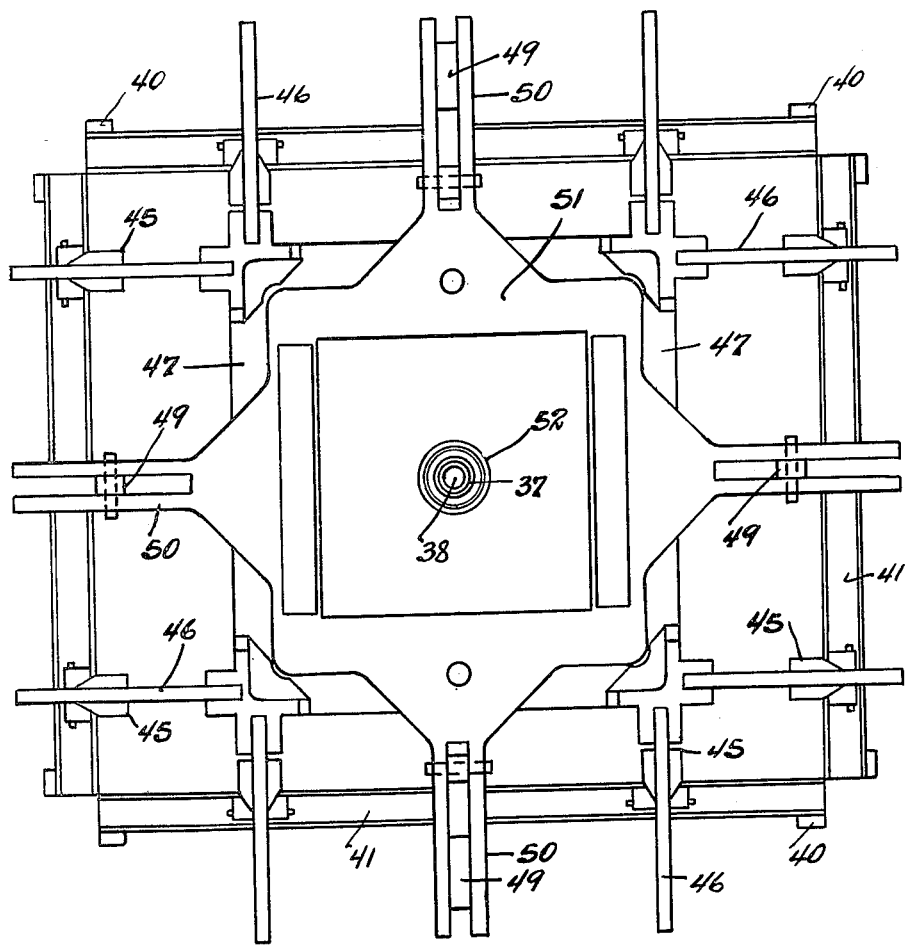

These and other objects will be made apparent in the appended detailed description in which Fig. 1 shows a plan view of a completed all-glass electrically welded double glazing unit embodying the invention; Fig. 2 shows a section taken on lines II—II of Fig. 1; Fig. 3 shows a sheet prepared for welding and the manner of applying preconduction stripes thereto; Figs. 4 to 10 inclusive show successive steps in the process of forming the welds; Fig. 11 shows a plan view of a diagrammatic arrangement of apparatus for practicing the process; Fig. 12 shows a section through Fig. 11 taken on lines XII—XII; Fig. 13 shows an enlarged plan view of the glass positioning means of Fig. 12; Fig. 14 shows a plan view of the top and bottom platens. Fig. 15 shows a side elevation of a portion of the platens of Fig. 14. Figs. 16 to 23 show a modification in the process of forming the weld, in which Fig. 16 shows a completed all-glass electrically welded double glazing unit; Fig. 17 shows a transverse section through the unit on lines XVII—XVII of Fig. 16; Figs. 18 to 21 inclusive show steps in the heating of the welds in a manner similar to Figs. 4 to 7 inclusive; Fig. 22 shows the condition of the weld during the last stage of heating after separation of the sheets of glass; Fig. 23 shows the same weld after application of air pressure thereto and Fig. 24 illustrates a weld produced by the process described in conjunction with Figs. 4 to 10.

The process embodied in the invention hereinafter described in detail comprises three main divisions; preparation and heating of the glass sheets, separation of the sheets for initial formation of the weld, and final shaping of the weld. Each of these main divisions of the process will be dealt with in detail as the description proceeds.

Referring now in detail to Figs. 1 to 10 of the drawings, reference character 1 indicates the double glazing unit comprised of upper sheet 2 and lower sheet 3, the peripheral margins of which are joined together by a unitary homogeneous all-glass weld 4. The sheets 2 and 3 may be of any desired size and configuration. Sheet 2 is preferably larger than sheet 3 in order that its marginal edges may overlap the edges of sheet 3 in the formation of the weld as illustrated in Fig. 5. It is to be understood, however, that although the presently preferred form of the weld requires one sheet to be larger than the other, satisfactory welds have been made with sheets of the same size. These latter welds, however, have not been as satisfactory from a production standpoint as the first named form of weld. In cases where the top sheet overlaps the bottom sheet, the bottom sheet has heated more quickly and uniformly.

The heating of sheets 2 and 3 is preferably done electrically; however, other suitable heating means may be used if desired. Glass at room temperatures is a non-conductor of electricity; however, when heated to sufficiently elevated temperatures it becomes a conductor. For the purpose of heating the glass to the required elevated temperatures, electrically conductive material such as a liquid suspension of finely divided graphite is applied in stripes of a predetermined electrical resistance at the areas to be heated. Suitable apparatus for application and control of electrical energy for heating the glass is disclosed in the Guyer et al. Patents 2,389,360 and 2,394,051.

The sequential application of electrical energy, referred to herein as cycles of heating, is adapted from the disclosures of these two patents and no detailed description of the process and apparatus used will be given, except as is necessary to apply the principles of the aforesaid patented disclosures to the apparatus used in the practice of the process employed herein for the manufacture of the welds in the disclosed double glazing unit.

Sheets 2 and 3 of the desired size and of suitable glass are preferably washed, dried, and sheet 2 striped with suitable electrically conductive material, as aforesaid. The stripes 5 being preferably applied to the under side of sheet 2 adjacent each marginal edge and extending between the adjacent opposite marginal edges of the sheet. Sheets 2 and 3 are then pre-heated and arranged in superposed relation with an air space of about $\frac{1}{16}"$ between them and the peripheral margins of sheet 2 overlapping the similar margins of sheet 3 about $\frac{1}{8}"$. The foregoing arrangement is illustrated in Fig. 4, where stripe 5 is about $\frac{3}{16}"$ wide and spaced inwardly about $\frac{1}{16}"$ from the marginal edge. The overlap of sheet 3 by sheet 2 is proportioned to the spacing between sheets 2 and 3, and need only be sufficient so that sheet 2 will embrace the marginal edges of sheet 3 during the welding process as indicated on Fig. 6. Since sheet 3 is initially heated solely by contact with sheet 2, more uniform heating of sheet 3, adjacent the area of the weld, is obtained by sheet 2 overlapping the marginal edge of sheet 3. The stripes are of such a resistance that the passage of electrical current removes them by sublimation before sheet 2 engages sheet 3 so that no foreign matter is entrapped in the weld to destroy the homogeneity thereof. The corners of sheets 2 and 3 are preferably cut as indicated at B on Fig. 3 to maintain a substantially uniform peripheral marginal edge.

The sheets 2 and 3 when disposed in the relation shown by Fig. 3 and before electrical energy is applied to stripes 5, have preferably been brought to an all-over temperature of about 1000° F. so that subsequent spot heating adjacent the stripes 5 will not crack or shatter the glass. Since the current that a given voltage will produce in glass depends on the resistance of the glass between electrodes and hence on its temperature, the conductive condition of a given path through the glass itself is utilized to determine the duration of the power application over such path required to bring it to the desired temperature. Thus by bringing up the current to some predetermined value on one edge of the sheet and tripping the circuit to switch the current to an adjoining edge of the sheet when the glass reaches a certain temperature and so continuing around the sheet repeatedly, the temperatures of all edges are maintained approximately uniform while being gradually raised. One application of electrical energy around the sheet is considered a completed cycle.

The presently preferred form of the process herein described requires nine heating cycles to complete the weld. Starting with an initial temperature of 1000° F. the temperature of the glass is gradually and substantially uniformly raised to about 1900° to 2000° F. This increase in temperature reaches a maximum in the area of the weld, and is progressively decreasing towards the center of the sheets 2 and 3. Likewise this maximum temperature is reached only after the stripes 5 have been sublimated and portions of the marginal edges of sheet 2 have softened and sagged down to engage the corresponding portions of sheet 3.

Referring now in detail to Figs. 4 to 10 inclusive, Fig. 3 is a fragmentary view of the sheets 2 and 3 at the start of the welding operation. The sheets are then at an approximate over-all temperature of 1000° F. Assuming the heating apparatus is set up to complete the welding operation in 9 cycles, current is applied to stripes 5 of sheet 2 by suitable electrodes, hereinafter described, and after 4 cycles the sheet begins to soften and sag as shown in Fig. 5. At the end of the 5th cycle sheet 2 will have sagged down to engage sheet 3, as illustrated by Fig. 6 and heating has become approximately uniform throughout its entire path between electrodes. During the heating to this point, the stripes 5 and the current used are so proportioned that the stripes 5 are sublimated so as to prevent introducing foreign matter into the weld. The 6th to 8th cycles of heating raises the temperature of the glass sufficient for the abutting portions of sheets 2 and 3 to soften and merge into substantially one homogeneous mass. Careful examination of a polished segment of the weld shows a fine line indicating the flow of the glass in the two sheets and is indicated by lines W on Figs. 4–10.

The weld so indicated in Fig. 7 is completed during the 8th cycle of heating and the sheets 2 and 3 are then ready to be separated to the desired spacing. For practical purposes $\frac{3}{16}"$ has been found satisfactory. Sheet 3 is held fast and sheet 2 is slowly withdrawn from position until the spacing between the sheets 2 and 3 reaches the desired amount. The weld between the sheets, after the first separation thereof, is approximately of the contour shown in Fig. 8. The position of the weld line W indicates that part of the glass of sheet 3 has been withdrawn therefrom to start the formation of a fillet at that point. During the withdrawal of sheet 2 from sheet 3 air rushes into the space S between the sheets through the pore hole P and prevents formation of a vacuum which would collapse the softened glass at the weld. Slow withdrawal of sheet 2 will ordinarily permit sufficient air to enter into space S through pore hole P, however we prefer to use a slight blast of air against P, such as from a tube, at 3 or 4 ounces per square inch pressure.

During the described withdrawing operation and filling of space S with air, the glass in the weld has cooled sufficiently to be self-supporting, but is still soft enough to be pliable. Sheet 2 is now quickly pushed downward toward sheet 3 about one half the distance between the sheets. This rapid reduction of the space between the sheets compresses the air in space S and the resultant increased air pressure evenly rounds out the fillets at the weld into substantially one continuous fillet. Sheet 2 is then withdrawn again to provide the required final spacing between the sheets and without material deformation of the fillets. The 9th cycle of heating is then completed.

The line of weld indicated by reference character W in the drawings, is in one sense a theoretical one indicating the result of the hot glass of sheet 2 engaging sheet 3. For all practical purposes however, satisfactory units have been made in which the weld line W is more nearly in the plane of the inside face of sheet 3. In all cases, however, care must be exercised to start a fillet with the inside face of sheet 3 during the initial separation of the sheets as indicated in Fig. 8.

The unit may now be removed to a suitable annealing chamber and slowly brought to room temperature. The unit may then be purged, as by filling space S with dry air, and pore hole P sealed by any suitable method. The unit is thus made into one which is hermetically sealed against entrance of moisture-laden air as the air pressure within space S increases and decreases under temperature changes. The weld between the sheets at each of the margins is uniform and rounded on its inner and outer surfaces, thus preventing undue stress concentrations as the sheets deflect with the expansion and contraction of the entrapped air within space S.

An appropriate embodiment of apparatus for use in the practice of the invention is illustrated diagrammatically in Fig. 11. This embodiment of apparatus includes a series of chambers, 10 for preheating, 11 for welding and 12 for transferring, and 13 for annealing, constructed of an appropriate refractory material such as fire brick. The chambers are in appropriate position, e. g. in side-by-side relationship. Chamber 10 constitutes a preheating chamber which is heated by any convenient means, such as electrical heater elements 14, Fig. 12, disposed about the side walls of the chamber. Of course, gas burners could be substituted for the electrical heating elements if so desired. Chamber 10 is provided with an outer door or inlet 15 having a closure 16 which may slide up or down in guides 17. Chamber 10 is designed to preheat the glass, for example, to a temperature of 800° or 1000° F. dependent upon the critical temperature of the glass in order to prevent breakage of the glass due to thermal stresses during subsequent welding operations.

Chamber 10 communicates with welding chamber 11 through a door or opening 18 formed below the partition 19 between the two chambers. A similar opening 20 provides communication below the wall 21 between the welding chamber 11 and the transfer zone or chamber 12.

For purposes of carrying sheets of glass through the chambers for successive operations, a trackway 22 is provided. This trackway extends through the various doors or openings to the chambers and preferably extends sufficiently far outside of the chamber 10 to provide a loading zone Z. Upon the trackway is disposed a first transfer car 23. The car should be composed of relatively refractory material such as stainless steel. It travels upon wheels 24 riding the track. It may also be provided upon its upper surface with series of studs or buttons 25 designed to support one or two sheets of glass in spaced relation with respect to the car. The car may be reciprocated upon the trackway by any convenient apparatus, for example, by means of an elongated rack bar 26 engaging a pinion 27. The pinion may be operated mechanically or manually, e. g. by crank 28, as desired, to run the car along the trackway.

Sheets of glass are appropriately preheated upon the car 23 in chamber 10 and are then run into the welding chamber for the subsequent union and shaping to form the double glazed units D.

The apparatus, as shown in Figs. 12 to 15, includes lower platen 29 and upper platen 30 which may be formed of any refractory material such as soapstone, high silica glass or any other appropriate material. These platens, as shown in Figs. 14 and 15, are both provided with one or more suitable depressions or grooves, 31 and 32, having connections 33 and 34 to a source of vacuum so that the sheets of glass upon them can be held securely in position during the various welding and forming operations. The lower platen preferably is fixed in position and may, for example, rest upon blocks of refractory material 35 upon the chamber bottom.

The uppermost of the platens 30 is attached to the lower extremities of a vertical reciprocable piston rod 37 which is tubular, as indicated at 38, in order to provide a vacuum connection for the slats or grooves 31. The piston extends upwardly through the roof of the chamber 11 and may be connected to any convenient operating mechanism, for example, a piston operating in a cylinder (not shown). Any mechanical means for reciprocating the piston might be provided.

A tube 39 connected to the lower platen 29 is connected to a source of vacuum (not shown) and is connected at its upper extremity to connecting passages 34 leading to depressions 32 in said platen.

Mechanism for accurately positioning or centering the plates of glass with respect to each other and with respect to the various elements of the apparatus in the welding chamber 11 are provided. Such mechanism may include fingers 40 attached to horizontal bars 41, one pair being provided for each of the four margins of the sheets of glass. The fingers may be stepped as indicated at 42 to accommodate the slight differences in dimension of the upper and lower sheets of glass. The bars may be swung inwardly or outwardly simultaneously in order to adjust or center the sheets of glass upon the car 23 by means of link mechanism which include lugs 43 and 44 upon the bars. Arms 45 attached to the lugs 43 are rigidly attached at their upper extremities (e. g. by welding) to brackets 46 projecting from a cross head 47 upon the lower extremity of a stationary hollow rod or support 48 which is concentric with the piston 37. Links 49 pivotally attached to the lugs 44 are also attached at their upper extremities to arms 50 upon a cross head 51 which is further secured to the lower extremity of a second tubular piston rod 52 concentric with rods 37 and 48. It is to be understood that the piston rods 37 and 52 are disposed in actuating cylinders or are provided with other mechanisms by which they can be lowered or raised individually or singly at will be the operator of the apparatus. Rod 48 is fixed to a support (not shown).

Apparatus for supplying current to the conductive stripes 5 upon the sheets of glass, e. g., the top sheet 2, includes electrodes 53 which are slotted as shown at 54 and have tips 55. The arms, in turn, are adjustably fixed upon the upper extremity of vertically disposed rods 56 of an electrically conductive material such as stainless steel by means of set screws 57 in slots 54.

It may be noted that the electrodes are adjusted to provide a slight spacing between the tips thereof and the edges of the conductive glass. When the voltage is applied, the current arcs over the gap to the conductive stripes and in so doing establishes a zone of higher temperature at each corner of the plates which renders the glass at this point more soft than at any other point.

The various operations in the welding chamber may conveniently be observed by the operator through a glazed port or door 58 in the side of chamber 11.

Transfer chamber 12 is also provided with a door 59 through which a handling device such as a set of tongs or a vacuum lifting device can be inserted to lift the units D from a second transfer car 23a that also runs on the trackway 22 and functions to transfer completed units from the welding chamber 11 to the transfer chamber 12 while sheets 2 and 3 are being preheated on car 23 in chamber 10; car 23 may be operated in any convenient way, e. g., by a rod 23b extending through the chamber wall.

Annealing chamber 13 is provided upon transfer chamber 12 and it is provided with an appropriate annealing rack 60 in which the units can be inserted while they are being annealed. The annealed units are removed from the rack through a door 61 in guides 62.

In the operation of the welding apparatus, sheets of glass are run into the chamber 11 after they have been preheated in chamber 10 upon the car 23. The platen 29 may be lightly dusted with a suitable non-sticking agent to prevent hot glass from sticking. The sheets may be accurately centered upon the car by bringing the links 49 downwardly through appropriate manipulation of the piston 52. When a lower sheet 3 has been accurately centered, the platen 30 is lowered and vacuum is applied to pick it up. The platen may then be raised, thus lifting the sheet and permitting the car to be retracted. The sheet is then lowered to the lower platen 29. The top sheet 2 can then be run in from preheating chamber 10; centered and picked up by platen 30. After the car has been retracted, the second sheet is lowered until it almost, but preferably does not quite touch the lower sheet and it is so supported. Usually the electrode tips will be near, but not quite touch the glass. About 1/8 inch spacing is good, but may be varied so long as the current can readily arc from the electrodes to the conductive stripes. The electrodes, when once set, need not be changed so long as the same size units are being formed. Of course, if the electrodes should become excessively burned, some adjustment or even replacement may be necessary. The arcs establish very hot zones at the corners of the glass so that adequate flow to form the corners is permitted.

Electrical current is supplied in the manner described in the Guyer patents already referred to. The edge portions of the sheets adjacent the stripes of conductive material are heated sufficiently to obtain conductivity after a short time. Heating is continued until the conducting stripe is burned off and the glass softens, droops and becomes welded to the lower sheet. The piston 37 is then operated to pull the plate 2 up sufficiently to form space S. As sheet 2 moves relative to sheet 3, a slight blast of air, say 3 to 4 oz. per sq. in., is directed against pore hole P to insure space S rapidly filling with air to avoid formation of a vacuum. The upper sheet is then abruptly forced downwardly by movement of the piston 37 to fillet the union between the sheets to the substantially U section shown in Fig. 9 and thereafter return to the position shown by the dot and dash lines to produce the form shown in Fig. 10. When welding and filleting are completed, the glass may be allowed to cool below the setting point so that it will not distort during subsequent operations.

The unit D may then be picked up by platen 30. The car 23a may be run under the unit and the platen lowered to deposit the unit. Subsequently the unit is carried by the car to transfer chamber 12 where it is picked up by suitable handling devices that may be inserted through door 59 and placed in annealing rack 60. The units when annealed are removed through door 61. It is desirable to fill the units with dry gas, e. g. dried air, through pore holes P and subsequently to seal the openings, e. g. by applying solder or by any other convenient technique.

The units are of great strength and can withstand great changes of barometer, as well as wide differentials of temperature between faces without breakage. This is largely due to the excellent filleting at the edges which obviates any angles at either face.

A modification of the invention of the process is disclosed in Figs. 16 to 23 of the drawings wherein the sheets 2a and 3a are striped, superposed and heated in the same manner as in Figs. 1 to 8, up to the end of the eighth cycle of heating.

In the modified process the sheets 2a and 3a are again separated to the desired spacing while a slight current of air (4 to 6 ounces per square inch pressure) is directed against pore hole P. The 9th cycle of heating is then completed to effect a substantially uniform heating of the weld around the entire periphery of the separated sheets. Thereafter, instead of manipulating the top sheet 2a to build up pressure within the unit to complete the internal fillets, a blast of air at about 15 lbs. per square inch pressure is directed against pore hole P. This blast of air is of very short duration, being continued only long enough to round out the internal fillets and not long enough to build up sufficient pressure within the unit to blow through the softened glass at the fillets. The operator can observe the forming of the fillets and discontinue the pressure before destruction of the weld occurs.

The advantages of this modified form of the process lies in better control of the shape of the inside fillet and more uniform exterior shape of the weld. When the weld and fillets are formed by the "push, pull" method previously described, the pushing downward of sheet 2 to increase pressure within the weld sometimes distorts the glass at the weld and when pulled back again to final position this distortion is not always removed. The weld when completed sometimes looks like that of Fig. 24. However, when the "pull and blow" method is used, the sheets are preferably separated at the end of the eighth cycle of heating, and upon completion of the 9th cycle of heating to effect a uniform heating within the newly shaped weld, the air is applied to "blow" the fillets without displacement of sheet 2a. This latter method results in uniformity of shape of the "pulled" weld and as the "blowing" of the weld is under the control and observation of the operator the exterior contour of the weld can also be controlled by the operator.

One factor in determining the contour of the weld is the duration of the time interval between the termination of the last or 9th cycle of heating and the application of air pressure to "blow" the fillets. The glass should be permitted to cool slightly, or as it is called "to set up," before blowing the fillets. The ambient conditions within the welding chamber and the characteristics of the glass used in initially forming sheets 2a and 3a will determine the duration of this time interval and the duration of the blowing operation. Another variable factor will be the vertical spacing of sheets 2a and 3a in Fig. 16 and the pressure of the air blast. Obviously increased spacing of the sheets results in an increased volume of air to be affected by the air blast, and the duration and intensity of the pressure of the air blast will determine the pressure ultimately built up within the unit in forming the weld fillets.

This application is a continuation of our abandoned application Serial No. 67,696, filed December 28, 1948.

We claim:

1. In a process of forming double glazing units of the character described comprising the steps of, providing two glass sheets one of which has marginal edge dimensions substantially equally greater than the corresponding margins of the other, the larger of said sheets having a pore hole therein and stripes of electrically conductive material disposed adjacent each marginal edge and extending between the adjacent opposite marginal edges, the sheets being disposed in superposed relation with the striped sheet uppermost and spaced from the lowermost sheet a distance substantially less than the final spacing of the sheets in the completed unit, heating the uppermost sheet by cycling an electric current through the said stripes until the sheet is heated to electrically conductive temperature and its marginal edges soften and sag into engagement with the marginal portions of the lower-most sheet, thereafter cycling electrical current through the engaging portions of both sheets to substantially uniformly raise the temperature therein to about 1900° to 2100° F. to form a weld, separating the sheets by pulling the upper sheet sufficiently slowly upwardly from the lower one to lift part of the glass of the lower sheet at the weld to start formation of a fillet with the lower sheet, passing at least one additional cycle of current through the connecting portion of the now separated sheets and thereafter introducing air under pressure into the space between the sheets to round out the fillets of both sheets at the weld into one continuous fillet, discontinuing the air pressure, annealing the completed unit and sealing the pore hole.

2. A process of forming an integral all glass double glazing unit from two separate glass sheets comprising the steps of providing two glass sheets of suitable shape, one of which sheets has a pore hole therein, and the marginal dimension of which is substantially equally greater than the corresponding margins of the other sheet, arranging the sheets in superposed relation with the larger sheet uppermost and spaced from the bottom sheet, heating the marginal portions of the top sheet until they soften and sag to embrace the corresponding marginal portions of the bottom sheet, heating the engaging marginal portions of the sheets to weld them together, separating the sheets so that the joint between the sheets draws a fillet from the lower sheet and bends the portion of the top sheet immediately adjacent the welded joint to form a fillet therewith, and increasing the air pressure within the space between the sheets to round out the said fillets into a continuous one.

3. A process of forming an all-glass weld between the sheets of glass in a double glazed unit comprising the steps of providing two glass sheets, one of which has linear dimension greater than the other, the larger of the two sheets having a pore hole therein and provided with stripes of electrically conductive material adjacent each margin thereof and substantially the same length as that of the adjacent margin, superposing the sheets in spaced relation so that the upper or larger of the two sheets overlap the bottom sheet an equal amount at each marginal edge thereof, passing an electric current through the stripes of the top sheet for localized heating of the marginal areas thereof until the glass softens and sags to engage the corresponding similar areas of the bottom sheet, continuing the heating of the engaged portions of the sheets until these portions merge into a unitary mass, separating the sheets to the desired spacing in the completed unit so that the softened area of the top sheet is deflected adjacent the weld to form a fillet whose lowermost portion is formed in part from the glass of the bottom sheet, increasing the air pressure within the space between the sheets to round out the inner face of the joint between the sheets into substantially a uniform curve, then annealing the unit.

4. A process of forming electrically welded double glazing units comprising the steps of providing two flat glass sheets, one of which is of greater surface area than the other and has a pore hole therein, superposing the sheets in a spaced relation less than that of the completed unit and such that the marginal edges of the top sheet overlap the corresponding edges of the lower sheet by a substantially equal amount, electrically heating the marginal areas of the top sheet for softening and sagging into engagement with similar areas of the bottom sheet, continuing the heating of the engaged surfaces of the sheets until they soften sufficiently to fuse into a unitary continuous weld, retaining the bottom sheet in fixed position and pulling the unfused portions of the top sheet away therefrom to the desired final spacing while air enters the newly formed space through the pore hole, then rounding the inner face of the still softened connection between the sheets by increasing the air pressure within the space between the sheets, thereafter decreasing the air pressure to atmospheric pressure, annealing the unit and then sealing the pore hole.

5. A process of forming an all-glass electrically welded double glazing unit comprising the steps of providing two flat glass sheets of the desired contour, one of the sheets being of greater surface area than the other and having connecting longitudinal stripes of electrically conductive material adjacent each margin thereof and having a pore hole in the larger sheet adjacent to and in spaced relation to one of the stripes, superposing the sheets in spaced relation with the larger sheet uppermost and extending a substantially equal amount beyond the vertical planes of each marginal edge of the lower sheet, cycling electric current through the stripes on the upper sheet to heat the glass immediately adjacent the stripes to softened condition so as to sag and engage the corresponding areas of glass in the lower sheet, continuing the cycling of current until the engaged portions of the sheets soften and weld into one continuous joint around the entire periphery of each sheet, retaining the bottom sheet in fixed position and withdrawing the top sheet to the desired final spacing, increasing the air pressure between the sheets above atmospheric pressure to round out the inner face of the connecting area between the now separated sheets, reducing the air pressure to atmospheric pressure, annealing the unit and sealing the pore hole.

6. A process as defined in claim 5 in which the increase in air pressure within the space between the sheets is effected by abruptly moving the top sheet towards the bottom sheet and then returning the top sheet to position.

7. A process as defined in claim 5 in which the increase in air pressure is immediately reduced upon reaching a maximum sufficient to shape the inner face of the connecting area of glass between the sheets.

8. A process as defined in claim 5 in which the increase of air pressure within the space between the sheets is obtained by directing a blast of air of short duration upon the pore hole.

9. A process as defined in claim 5 in which the glass adjacent the weld before separation of the sheets is raised to a temperature sufficiently high to cause the movement of the top sheet to lift a portion of the glass of the bottom sheet at the weld above the plane of the inner face of the bottom sheet.

10. A process as defined in claim 5 in which the last cycle of heating is completed after the sheets are separated and before increasing the air pressure within the space between the sheets to form the fillet.

11. A process as defined in claim 5 in which the pressure within the unit is increased by directing a blast of air of about 15 p. s. i. against the pore hole for about one second.

12. A process as defined in claim 5 in which the overlap of the top sheet is sufficient to cause the top sheet upon sagging to engage both the horizontal face of the bottom sheet adjacent the marginal edge and the vertical face of the marginal edge.

13. A process of forming heremetically sealed double glazed units which comprises supporting two plates of glass heated above the critical temperature in superposed but slightly spaced relationship with respect to each other, then heating the margins of the upper plate until they droop and become welded with the margins of the lower plate, pulling the upper plate upwardly while holding the lower plate substantially flat to form a sealed chamber between the plates, then vibrating the plates with respect to each other to provide a curved filleted union between the margins of the plates.

14. A process of forming heremetically sealed double glazed units which comprises providing a pair of plates of glass, one plate having face dimensions slightly greater than the corresponding dimensions of the other plate, one plate having a porehole formed therein, heating the plates above the critical temperature, superposing the plates in slightly spaced relationship with respect to each other with the plate of greater dimensions uppermost, passing electrical current through the margins of the upper plate until they become heated and droop down to form a weld with the lower plate, then pulling the upper plate upwardly to provide a chamber between the plates, subsequently annealing the resultant unit and closing the pore holes.

15. In a process of forming a sealed double glazed unit, the steps which comprise applying stripes of conductive material to the edges of a plate of glass, superposing the plate over a plate of slightly less face dimensions, passing electrical current through the stripes by arcing from electrodes spaced from the stripes near the corners of the plate to heat the margins of the plate and to cause them to droop and become fused to the plate below, then pulling the unfused portions of the plates apart to form a chamber and working one plate vertically to provide reinforcing fillets at the union between the plates.

16. A process of forming hermetically sealed double glazed units, comprising the steps of supporting two glass sheets in superposed spaced relation, providing a pore hole in one of the sheets, heating the marginal portions of the upper sheet until they soften and droop into engagement with the lower sheet to form a fused connection therewith, pulling the unfused portion of the upper sheet away from the lower sheet while the glass in the upper sheet adjacent the fused margins is still in a softened condition, the space between the sheets being filled with air as the sheets are separated, abruptly returning the upper sheet toward the bottom sheet for a portion of the initially separated distance to build up pressure in the entrapped air between the sheets for a short period of time so that the softened inner faces thereof adjacent the fused connection are substantially uniformly filleted, then quickly returning the displaced portion of the top sheet to the desired spaced relation to the bottom sheet.

17. A method of forming hermetically sealed double glazed units of the character described, which method comprises disposing two plates of glass heated to about the critical temperature in spaced face to face relationship to each other, then heating the marginal areas of the one plate until it softens and droops to fuse with the marginal face of the other plate, then withdrawing the unfused portion of the one plate away from the other plate to provide an air filled chamber having spaced faces joined by fused marginal surfaces, abruptly returning the withdrawn plate for a portion of the distance to increase air pressure within the chamber to effect filleting of the fused connection between the plates, then returning the plate to its original withdrawn position.

18. A process of forming hermetically sealed double glazed units, which process comprises providing a lower plate of glass and an upper plate of glass, the peripheral margins of the upper plate projecting beyond the corresponding margins of the lower plate, the upper plate having a pore hole therein, superposing the upper plate in slightly spaced relation to the lower plate, heating the marginal areas of the upper plate until they droop and fuse to the marginal areas of the lower plate, withdrawing the upper plate from the lower plate by causing the softened portions of the upper plate adjacent the fused margins to bend relative to both plates while air enters the space so formed through the pore hole, abruptly returning the withdrawn plate for a portion of the distance to cause compression of the entrapped air and round out the bent portions of the top plate into a smooth inner fillet, then returning the top plate to its initially withdrawn position, subsequently annealing the unit and sealing the pore hole.

19. A process of forming a sealed double glazed unit, which process comprises applying stripes of conductive material adjacent the marginal edges of a plate of glass having a pore hole therein, superposing the plate over a plate of less face dimension, passing electrical current through the stripes to heat the marginal portions of the upper plate until they droop and fuse with the marginal areas of the lower plate, withdrawing the unfused portions of the upper plate from the lower plate forming a chamber between the plates into which air passes through the pore hole, rapidly partially returning and again withdrawing the top plate to form reinforcing fillets at the union between the plates through compression of the air within the chamber.

20. The process as defined in claim 19 in which air is blown against the pore hole during separation of the plates to prevent formation of a vacuum within the forming chamber.

21. A method of producing hermetically sealed double glazed units which comprises supporting two sheets of glass in superposed but slightly spaced relationship with respect to each other, heating the margins of the upper sheet until they droop and become welded with the margins of the lower sheet, pulling the upper sheet upwardly to provide a chamber between the sheets and abruptly increasing the air pressure within the unit to effect filleting of the welded connection between the sheets.

22. A method of producing hermetically sealed double glazed units which comprises supporting two sheets of glass in superposed but slightly spaced relationship to each other, one of said sheets having a pore hole therein, heating the margins of the upper sheet until they droop and become welded with the margins of the lower sheet, pulling the upper sheet upwardly to provide a chamber between the sheets and abruptly increasing the air pressure within the unit to effect filleting of the welded connection between the sheets by directing a blast of air against the pore hole.

WILLIAM R. CLEVER.
HARRY O. PHALIN.

REFERENCES CITED

The following references are of record in the file of this patent:

UNITED STATES PATENTS

| Number | Name | Date |
|---|---|---|
| 2,282,831 | Shutts | May 12, 1942 |
| 2,336,544 | Hopfield | Dec. 14, 1943 |
| 2,389,360 | Guyer et al. | Nov. 20, 1945 |
| 2,398,371 | Gerspacher | Apr. 16, 1946 |
| 2,419,400 | Haven | Apr. 22, 1947 |